(12) United States Patent
Franz

(10) Patent No.: US 10,489,783 B2
(45) Date of Patent: Nov. 26, 2019

(54) MOBILE COMMERCE PAYMENT SYSTEM

(71) Applicant: Visa International Service Association, San Francisco, CA (US)

(72) Inventor: Cedric Ronald Franz, Cape Town (ZA)

(73) Assignee: Visa International Service Association, San Francisco, CA (US)

(*) Notice: Subject to any disclaimer, the term of this patent is extended or adjusted under 35 U.S.C. 154(b) by 307 days.

(21) Appl. No.: 15/009,573

(22) Filed: Jan. 28, 2016

(65) Prior Publication Data

US 2016/0148204 A1 May 26, 2016

Related U.S. Application Data

(63) Continuation of application No. 12/992,403, filed as application No. PCT/IB2009/005566 on May 12, 2009, now Pat. No. 9,280,769.

(30) Foreign Application Priority Data

May 14, 2008 (ZA) .................... 2008/04181

(51) Int. Cl.
*G06Q 20/00* (2012.01)
*G06Q 20/38* (2012.01)
(Continued)

(52) U.S. Cl.
CPC ....... *G06Q 20/3829* (2013.01); *G06Q 20/085* (2013.01); *G06Q 20/12* (2013.01);
(Continued)

(58) Field of Classification Search
CPC .................................................. G06Q 20/085
(Continued)

(56) References Cited

U.S. PATENT DOCUMENTS

| 9,280,769 B2* | 3/2016 | Franz ................... G06Q 20/085 |
| 2004/0019564 A1* | 1/2004 | Goldthwaite .......... G06Q 20/04 705/44 |

(Continued)

FOREIGN PATENT DOCUMENTS

| EP | 1635303 | 3/2006 |
| GB | 2366432 | 3/2002 |

(Continued)

OTHER PUBLICATIONS

Crowe, Marianne. Mobile Phone Technology: "Smarter" Than We Thought. How Technology Platforms are Securing Mobile Payments in the U.S. (Federal Reserve Bank of Boston Nov. 16, 2012). Retrieved online Jul. 14, 2019. (Year: 2012).*

(Continued)

*Primary Examiner* — James A Reagan
(74) *Attorney, Agent, or Firm* — Kilpatrick Townsend & Stockton LLP

(57) ABSTRACT

A mobile commerce system and components thereof are provided in which multiple wireless mobile communications devices (mobile devices) (1) each has a unique electronic identification and processing circuit (2) capable of encrypting data utilizing an encryption key and a first software application providing connectivity to commercial webpage servers (4) for purposes that include the conduct of selected transactions involving a payment for goods or services. Each mobile device is independently enabled to conduct financial transactions in real time by communication with a financial institution. Each mobile device further has a second software application termed mobile payment application adapted to interact with the first application to receive data as to a payment required to conclude a transaction conducted by way of a commercial webpage server. The mobile payment application initiates an instruction to the financial institution to make a payment to a payee designated by way (Continued)

of such data wherein the instruction is encrypted utilizing the unique electronic identification and processing circuit.

20 Claims, 2 Drawing Sheets

(51) Int. Cl.
G06Q 20/08 (2012.01)
G06Q 20/32 (2012.01)
G06Q 20/34 (2012.01)
G06Q 20/12 (2012.01)
G06Q 20/40 (2012.01)
(52) U.S. Cl.
CPC ......... *G06Q 20/32* (2013.01); *G06Q 20/3227* (2013.01); *G06Q 20/3229* (2013.01); *G06Q 20/3563* (2013.01); *G06Q 20/4012* (2013.01); *G06Q 2220/00* (2013.01)
(58) Field of Classification Search
USPC .......................................................... 705/77
See application file for complete search history.

(56) References Cited

U.S. PATENT DOCUMENTS

2004/0087339 A1* 5/2004 Goldthwaite .......... G06Q 20/10
455/558
2008/0071634 A1* 3/2008 Rampell ................ G06Q 30/08
705/26.3
2011/0246374 A1 10/2011 Franz

FOREIGN PATENT DOCUMENTS

| WO | 2007123856 | 11/2007 | |
|----|------------|---------|---|
| WO | 2009138848 | 11/2009 | |
| WO | 2010023683 | 3/2010 | |
| WO | WO-2010023683 A2 * | 3/2010 | ........... H04L 63/062 |
| WO | WO 2010023683 A2 * | 3/2010 | ........... H04L 63/062 |
| WO | 2009138848 | 11/2010 | |

OTHER PUBLICATIONS

U.S. Appl. No. 12/992,403, Final Office Action dated Dec. 21, 2012, 13 pages.
U.S. Appl. No. 12/992,403, Final Office Action dated Nov. 28, 2014, 8 pages.
U.S. Appl. No. 12/992,403, Non-Final Office Action dated Aug. 3, 2012, 12 pages.
U.S. Appl. No. 12/992,403, Non-Final Office Action dated Jul. 31, 2014, 8 pages.
U.S. Appl. No. 12/992,403, Notice of Allowance dated Oct. 28, 2015, 15 pages.
International Application No. PCT/IB2009/005566, International Preliminary Report on Patentability dated Nov. 25, 2010, 5 pages.
International Application No. PCT/IB2009/005566, International Search Report and Written Opinion dated Sep. 30, 2010, 7 pages.

\* cited by examiner

MOBILE COMMERCE PAYMENT SYSTEM

CROSS REFERENCE TO RELATED APPLICATIONS

The present application is a continuation of co-pending U.S. patent application Ser. No. 12/992,403 filed on Apr. 12, 2011 which is a National Stage of International Application No. PCT/IB2009/005566, International Filing Date May 12, 2009, and which claims the benefit of South African Patent Application No. 2008/04181, filed May 14, 2008, the disclosures of which are incorporated herein by reference.

FIELD OF THE INVENTION

This invention relates to a mobile commerce system that includes a payment system whereby goods or services can be located and selected using communications between a mobile communications device and the webpage server of a supplier and wherein payment is required to be made for the selected goods or services.

More particularly, the invention relates to a mobile commerce system in which the mobile communications devices each include a unique electronic identification and processing circuit capable of encrypting data utilizing an encryption key. A typical unique electronic identification and processing circuit is that of the well-known SIM card that can be used in cellular telephones or other wireless communications devices for identification and encryption purposes.

BACKGROUND TO THE INVENTION

Applicant believes that there is considerable potential in the mobile commerce field in spite of the ever increasing activity reported. One factor that restrains additional growth of this market sector appears to be the security of electronic payments made for goods and services purchased on-line. In particular, credit card or debit card information inputted into the mobile communications device, typically a cellular telephone, is typically transmitted in an un-encrypted form simply because encryption keys that would need to be shared between the communications device and payment engine in order to encrypt and to decrypt the relevant data cannot be provided in practice.

This being so, a typical mobile commerce transaction developed on a mobile device is illustrated in FIG. 1. In such an application multiple mobile devices, in this instance cellular telephones (A), are provided wherein communication is enabled via a wireless network (B) with selected webpage servers (C) of multiple suppliers, such as online stores or booking applications. In order to complete a transaction it is often required to perform a payment and these applications need to connect to payment systems to facilitate the actual payment by transmitting the payment details to a backend server to perform the actual payment.

A mobile application would normally transmit the relevant data that typically includes credit or debit card or other financial account data to the webpage server or its associated payment engine using a secure TCP/IP protocol (e.g. HTTPS).

However, in most cases this level of security is not really sufficient. Each of the e-commerce stores needs to develop code to integrate to a payment engine or a financial switch (D) to perform the payment that is ultimately only finalised when the relevant banking institution (E) has cleared the transaction typically in accumulated batches of transactions.

Such applications are typically complicated pieces of development, but it is obviously necessary to ensure the integrity of the application. Every application on the mobile device that needs to capture payment will require the same functionality to capture the payment details, securely transmit the data to a backend system and then to integrate and pass these details to a payment engine or financial switch to perform the transaction. This is a substantial duplication of code both on the mobile device and the backend server. Of course, it is to be remembered that mobile devices have a limited amount of electronic capacity for processing and storing data.

Furthermore, payment details from online stores ultimately go through a financial switch (e.g. Visa or Mastercard etc). These transactions enter the switch in the country of the online store and not the country of the user making the payment. As a result these transactions are normally not conducted in real time and are processed batchwise.

A typical mobile commerce system would thus gather the payment information from the user and then submit this data to a backend server that then connects to a payments engine. This requires that the mobile commerce provider has online connectivity to the payment engine and has implemented the often tricky interface to the payment engine.

The general difficulties have led to the creation of various payment organisations often referred to as financial cyber mediaries, probably the most well-known of which is the E-BAY™ owned organisation known as PAYPAL™, an e-mail based payment system in which payment is collected by the payment organisation and subsequently paid over to the recipient.

Various other efforts have been made to enhance the security of electronic payments and in recent times a cellular telephone based payment system by the name of MOBILL-CASH™ has been introduced that avoids the problem by adding payments to the actual cell phone account. However, this solution may well be unacceptable to cellular telephone service providers in that their responsibility of securing payments of their accounts is substantially increased and the addition of service functions outside of the provision of a telephone service may not be acceptable.

Payment for goods or services purchased over the Internet therefore represents a serious technical problem that existing solutions have not been able to overcome to a satisfactory extent and in a satisfactorily secure manner.

OBJECT OF THE INVENTION

It is an object of this invention to provide a mobile commerce payment system and components thereof that avoid at least some of the disadvantages of the existing payment systems that are outlined above.

SUMMARY OF THE INVENTION

In accordance with one aspect of this invention there is provided a mobile commerce system in which multiple wireless mobile communications devices (mobile devices) each has a unique electronic identification and processing circuit capable of encrypting data utilizing an encryption key and wherein each mobile device has a first application providing connectivity to commercial webpage servers for purposes that include the conduct of selected transactions involving a payment for goods or services and wherein the mobile device is independently enabled to conduct financial transactions in real time by communication with a financial institution, the mobile commerce system being characterized in that the mobile device further has a second application (herein termed mobile payment application) adapted to interact with the first application to receive data as to a payment required to conclude a transaction conducted by way of a commercial webpage server by way of the first application, to process such data to cause the creation of an instruction to the financial institution to make a payment to a payee designated by way of such data with the instruction being encrypted utilizing the unique electronic identification and processing circuit, wherein the encrypted instruction is transmitted to the financial institution, and a payment report is received from the financial institution.

Further features of the invention provide for the communications device to be a mobile telephone, in particular a cellular telephone; for the unique electronic identification and processing circuit to be that of a subscriber identity module (SIM) card that typically has at least one unique encryption key embedded therein at factory level; for the webpage server to be associated with the World Wide Web; and for the mobile payment application to be adapted to transmit a successful payment report to the webpage server or associated payment engine to complete the transaction or, in the alternative, or in addition, for the system to be such that the financial institution transmits a successful payment report directly to the webpage server or associated payment engine.

The invention also provides a mobile communications device adapted to operate as a mobile device in a system as defined above.

The invention still further provides a method of performing a secure online commercial transaction using a mobile communications device that has a unique electronic identification and processing circuit capable of encrypting data utilizing an encryption key and wherein the mobile device has a first application providing connectivity to commercial webpage servers for purposes that include the conduct of selected transactions involving a payment for goods or services and wherein the mobile device is independently enabled to conduct financial transactions in real time by communication with a financial institution, the method comprising the steps of operating the wireless mobile communications device to connect to a commercial webpage server offering goods or services in exchange for payment therefor, selecting goods or services for which payment is required thereby initiating a transaction, and receiving information as to payment required, the method being characterized in that a second application (mobile payment application) resident on the communications device is adapted to interact with the first application to receive data containing information as to the payment required to conclude the transaction initiated by way of the commercial webpage server utilizing said first application, processing such data to cause the creation of an instruction to the financial institution to make a payment to a payee designated by way of such data wherein the instruction is encrypted utilizing the unique electronic identification and processing circuit wherein the encrypted instruction is transmitted to the financial institution from the mobile communications device, and a payment report is received by the mobile communications device from the financial institution.

Further features of the method of the invention will be quite apparent from what is set out above.

In order that the invention may be more fully understood an expanded description thereof follows with reference to the accompanying drawings.

DETAILED DESCRIPTION WITH REFERENCE TO THE DRAWINGS

Figure 1:
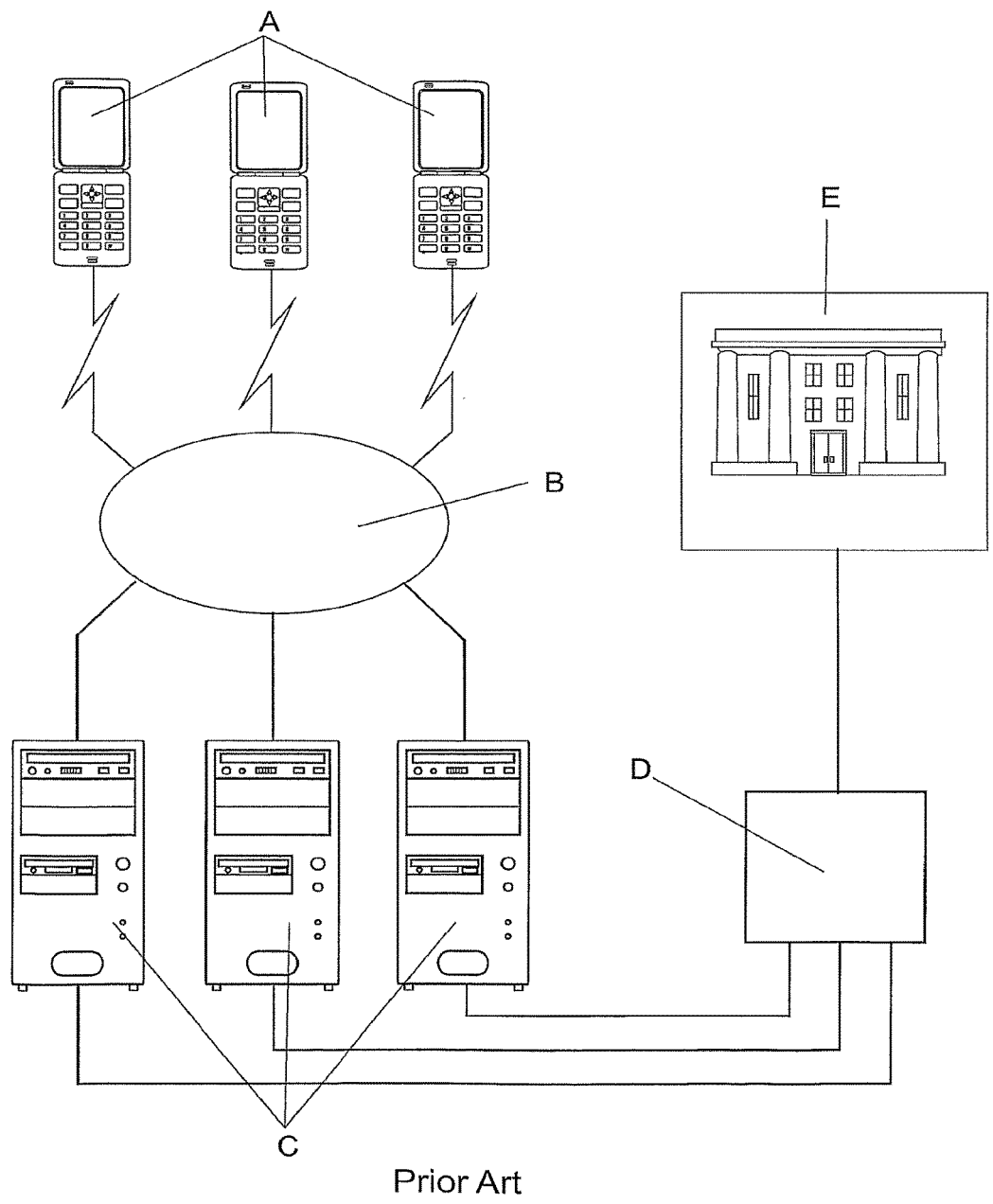
FIG. 1 is a schematic illustration of a common prior art system for the payment of goods and services in a mobile commerce situation; and,
FIG. 2 is a similar illustration of a system according to the invention.
Figure 2:
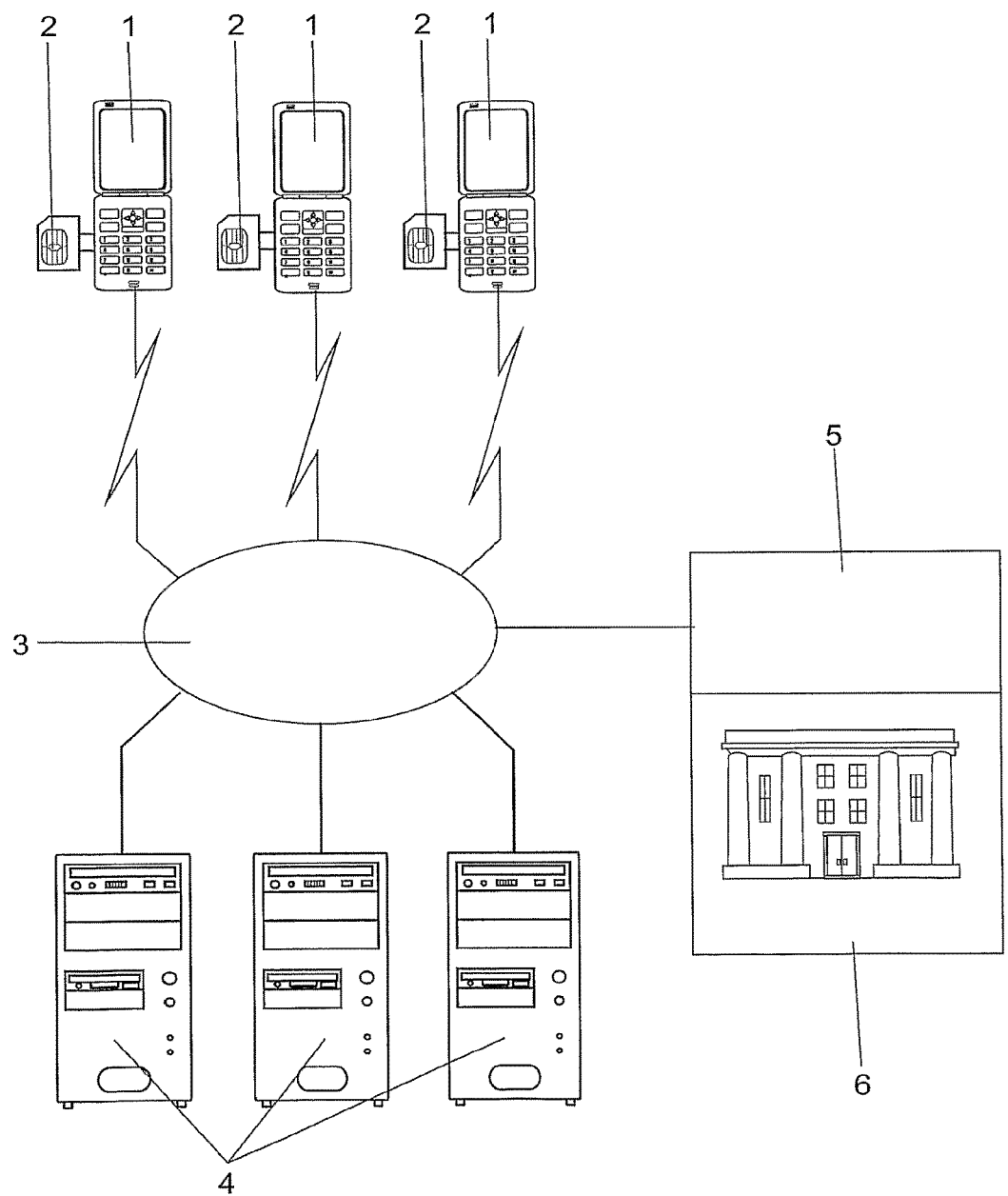

In its most simple implementation, and as illustrated in FIG. 2, a mobile commerce system according to the invention may include multiple wireless mobile communications devices, in this instance cellular telephones (1), each having a unique electronic identification and processing circuit capable of encrypting data utilizing an encryption key, in this instance in the form of a SIM card (2). As will be apparent to those skilled in the art the SIM card has at least one encryption key loaded onto it at factory level for the encryption of personal identification numbers (PINs) and, in this instance, payment details generated by the mobile payment application. The SIM card can thus be used to sign the transaction using hardware algorithms in the SIM and security keys that reside thereon. Encryption of this nature renders a transaction significantly more secure than payments utilising existing expedients of online stores and booking applications according to the prior art.

Each mobile device has a browser in the form of a first software application providing connectivity by way of a wireless network (3) to commercial web page servers (4) for purposes that include the conduct of selected transactions involving a payment for goods or services in well known manner.

Each mobile device is independently enabled to conduct financial transactions in real time by communication with a financial institution, and whilst there are various possibilities, applicant prefers that their own cellular telephone-based banking system promoted under the trade mark FUNDAMO™ be employed.

As provided by this invention, each mobile device further has a second software application in the form of a mobile payment application adapted to interact with the first application to receive data as to a payment required by a commercial webpage server (4) for completion of a transaction implemented by way of the first application. Such interaction may take place by way of a plugin written for the browser that connects to the mobile device in any suitable or appropriate manner. The mobile payment application is adapted to process such data to create an instruction to the financial institution to make a payment to a payee designated by the webpage server and to encrypt the instruction utilizing the encryption key present in the SIM card so that an encrypted instruction is transmitted to a co-operant backend server (5) that operates in concert with a financial institution (6). This is done by using the 3DES algorithm and a key that was earlier provisioned onto the SIM by the mobile operator.

The mobile payment application is thus a software application that resides on the mobile device alongside other applications. It has an open application programming interface (API) that takes payment details and prompts the user to enter a personal identification number (PIN). The details can be sent to the application either from another application on the phone or via another connection method from an application that does not reside on the phone. Examples of this are from a retail till, point-of-sales device or from another mobile device. Where the application submitting the details does not reside on the mobile device the payment details could be sent using a number of different wireless communication methods such as SMS, Wi-Fi and Bluetooth.

The payment details would normally include the identifier of the application sending the request, payment amount and payment reference. The mobile payment application would then display to the user the payment details and ask the user to verify the payment by entering a PIN. This PIN may then be used to sign the payment using ISO PIN encryption algorithms and a secure key that resides on the SIM card. The payment details are then sent from the mobile payment application to the cooperant backend server.

The payment application associated with the backend server is adapted to send a payment report, either successful or unsuccessful, to the relevant mobile device and the mobile payment application on the mobile device, if the payment is successful, is adapted to transmit a payment report to the webpage server in order to conclude the transaction.

As an alternative, or in addition, the backend server could be adapted to transmit a successful payment report directly to the webpage server in order to enhance the confidence in the report.

It will be understood that by having a single mobile payment application that performs the payment portion of the transaction, for example, an on-line store or booking application, the latter applications are not required to connect to a payment engine or financial switch. Any duplication of code is thus also eliminated.

Still further, the size of the online store or booking application is reduced by removing the payment portion from the application. A single payment application of this nature that all the online stores and booking systems can use will greatly reduce the space restrictions on the mobile device.

It is further to be noted that a system according to the invention will communicate with a backend application that resides in the user's country and there are significant advantages to this, particularly in terms of checking user balances and user PIN's. Also, transactions conducted using a system of this invention can be carried out in real time thereby obviating any difficulties associated with subsequent clearing in batches of accumulated transactions.

It will be understood that numerous variations may be made to be system described above without departing from the scope hereof.

The invention claimed is:

1. A communication device configured to communicate with a first remote server and a second remote server, the communication device comprising:
   an electronic identification circuit adapted to:
      store an encryption key;
   a payment application adapted to:
      communicate with the first remote server;
   a first software application adapted to:
      communicate with the payment application and the second remote server associated with a page that offers goods or services for purchase,
      receive, from the second remote server, a payee designated by the second remote server for a payment transaction to purchase the goods or the services, and
      send, to the payment application in the communication device, payment details for performing the payment transaction, wherein the payment details include the payee; and
   wherein the payment application is further adapted to:
      receive, from the first software application, the payment details for performing the payment transaction to purchase the goods or the services, wherein the payment details include a payment amount and the payee designated by the second remote server;
      generate an encrypted instruction containing the payment details utilizing the encryption key stored on the electronic identification circuit;
      send the encrypted instruction to the first remote server to transmit payment in real time to the payee designated by the second remote server; and
      receive, from the first remote server, a communication associated with the payment transaction in response to the first remote server receiving the encrypted instruction containing the payment details.

2. The communication device of claim 1, wherein the payment transaction is performed without the first software application having to communicate with the first remote server.

3. The communication device of claim 1, wherein the first software application is a browser application.

4. The communication device of claim 1, wherein the communication device further includes a third software application that uses the payment application to perform transactions.

5. The communication device of claim 1, wherein the communication device is a mobile phone.

6. The communication device of claim 1, wherein the electronic identification circuit is a subscriber identity module (SIM).

7. The communication device of claim 1, wherein the first remote server transmits a successful transaction report to the remote second server.

8. The communication device of claim 1, wherein the payment details further comprise a payment reference, and an identifier for the first software application, and wherein the first software application is further adapted to prompt a user for entry of a personal identification number (PIN) and then use the personal identification number and the encryption key to sign the payment details.

9. The communication device of claim 1, wherein the encryption key is provisioned on the electronic identification circuit by a mobile operator.

10. The communication device of claim 1, wherein the first remote server is associated with a financial institution.

11. A method for performing a transaction using a communication device communicatively coupled to a first remote server and a second remote server, the communication device including an electronic identification circuit, a payment application and a first software application, the method comprising:
   communicating, by the first software application, with the second remote server associated with a page that that offers goods or services for purchase;
   receiving, by the first software application, a payee for a payment transaction to purchase the goods or the services, wherein the payee is designated by the second remote server;
   sending, by the first software application to the payment application in the communication device, payment details for performing the payment transaction, wherein the payment details include the payee;
   receiving, at the payment application from the first software application, the payment details for performing the payment transaction to purchase the goods or the services, wherein the payment details include a payment amount and the payee designated by the second remote server;

generating an encrypted instruction containing the payment details utilizing an encryption key stored on the electronic identification circuit;

sending the encrypted instruction to the first remote server to transmit payment in real time to the payee designated by the second remote server; and receiving, at the payment application from the first remote server, a communication associated with the payment transaction in response to the first remote server receiving the encrypted instruction containing the payment details.

12. The method of claim 11, wherein the payment transaction is performed without the first software application having to communicate with the first remote server.

13. The method of claim 11, wherein the first software application is a browser application.

14. The method of claim 11, wherein the communication device further includes a third software application that uses the payment application to perform transactions.

15. The method of claim 11, wherein the communication device is a mobile phone.

16. The method of claim 11, wherein the electronic identification circuit is a subscriber identity module (SIM).

17. The method of claim 11, wherein the first remote server transmits a successful transaction report to the second remote server.

18. The method of claim 11, wherein the payment details further comprise a payment reference, and an identifier for the first software application, and wherein the first software application is further adapted to prompt a user for entry of a personal identification number (PIN) and then use the personal identification number and the encryption key to sign the payment details.

19. The method of claim 11, wherein the encryption key is provisioned on the electronic identification circuit by a mobile operator.

20. The method of claim 11, wherein the first remote server is associated with a financial institution.

* * * * *